United States Patent [19]
Draves

[11] Patent Number: 5,873,124
[45] Date of Patent: Feb. 16, 1999

[54] VIRTUAL MEMORY SCRATCH PAGES

[75] Inventor: Richard P. Draves, Seattle, Wash.

[73] Assignee: Microsoft Corporation, Redmond, Wash.

[21] Appl. No.: 796,409

[22] Filed: Feb. 6, 1997

[51] Int. Cl.$^6$ ...................................................... G06F 12/10
[52] U.S. Cl. ........................................... 711/202; 711/203
[58] Field of Search ................................... 711/202, 203, 711/206, 207, 208

[56] References Cited

PUBLICATIONS

Rashid, Richard et al., "Machine–Independent Virtual Memory Management for Pages Uniprocessor and Multi-processor Architectures," Department of Computer Science, Carnegie Mellon University, 1987.

Bala, Kavita et al., "Software Prefetching and Caching for Translation Lookaside Buffers," MIT Laboratory for Computer Science, Cambridge, MA, date unknown.

*Primary Examiner*—Tod R. Swann
*Assistant Examiner*—Kevin L. Ellis
*Attorney, Agent, or Firm*—Lee & Hayes, PLLC

[57] ABSTRACT

A computer system includes physical memory, a virtual memory system, and a protected operating system kernel. The kernel has kernel functions that accept and use virtual memory addresses from user processes. When an invalid virtual memory address is used by a kernel function, the memory address is automatically mapped to a scratch location in physical memory, so that the kernel function accesses the scratch location rather than generating an exception.

27 Claims, 3 Drawing Sheets

VIRTUAL MEMORY SCRATCH PAGES

RELATED APPLICATIONS

This application is related to a prior-filed U.S. patent application entitled "Virtual Memory System and Methods," Ser. No. 08/639,773, filed Apr. 29, 1996, which is hereby incorporated by reference.

This application is also related to two applications that are being filed concurrently herewith: an application entitled "Variably-Sized Kernel Memory Stacks," by inventors Richard P. Draves, Scott Cutshall, and Gilad Odinak; and an application entitled "Sharing Executable Modules Between User and Kernel Threads," by inventors Richard P. Draves, Scott Cutshall, and Gilad Odinak. These applications are also incorporated by reference.

TECHNICAL FIELD

This invention relates to the use of virtual memory within protected operating system kernel functions, and to the protection of such kernel functions from invalid memory references supplied by user processes which invoke these kernel functions.

BACKGROUND OF THE INVENTION

It is common for a computer processor and associated operating system to have two different levels of resources and protection. One level, referred to as a non-privileged mode or user mode, is used by various operating system components, application programs, and other so-called "user" processes or programs. At this level, an execution thread is prevented by the operating system and by the computer processor from performing certain security-critical operations. The thread is also prevented from directly accessing many system resources. The purpose of the non-privileged execution mode is to isolate a user process as much as possible so that it cannot interfere with other user processes or with operating system functions. While a user process may itself crash, it should not be able to crash other programs or the operating system.

The other level of execution is referred to as privileged mode, system mode, or kernel mode. Critical operating system components are implemented in kernel mode-kernel-mode components are responsible for things like virtual memory management, responding to interrupts and exceptions, scheduling execution threads, synchronizing the activities of multiple processors, and other critical or sensitive functions. Such components, which execute from system mode, are generally referred to collectively as "the kernel."

A typical approach to managing computer system memory is to allocate some portion of the memory to the operating system or kernel and another portion for application or user processes. The kernel typically runs in a dedicated or private virtual address space. The kernel or system virtual address space is protected, by processor hardware, from being accessed by any execution thread that is not in the privileged execution mode. Therefore, in practice, the kernel address consists of a range of virtual addresses that cannot be directly accessed by user processes. Current microprocessors have a 4 gigabyte virtual address space, which is typically divided for use by the kernel and by a user process, respectively. For example, the upper 2 gigabytes of these addresses might be reserved for the kernel, while the lower 2 gigabytes would be available for a user process. Since only one user process typically executes at any given time, the portion of the system memory allocated for a user process is entirely used by the current executing process. Each user process would than have its own 2 gigabyte virtual address space. A user process may conventionally access only the system memory allocated to the user process. The kernel may access both the kernel system memory and the user process system memory.

The kernel is responsible for supervising the virtual memory system in most computer systems. With virtual memory, a process is assigned its own virtual address space, which is not available to other processes. Through its virtual memory, a process has a logical view of memory that does not correspond to the actual layout of physical memory. Each time a process uses a virtual memory address, the virtual memory system translates it into a physical address using a virtual-to-physical address mapping contained in some type of look-up structure and address mapping database.

FIG. 1 illustrates the mapping of a virtual memory space 10 to physical memory 12. The virtual memory space is divided into blocks 14 of equal size called pages. Physical memory is divided into blocks 16 called page frames, which are used to hold pages. Data structures 18, usually including what is known as a "translation lookaside buffer" (TLB), are used to store the mappings between virtual memory pages 14 and physical memory page frames 16. Each time a process uses a virtual memory address, the virtual memory system translates it into a physical address using a virtual-to-physical address mapping contained in data structures 18. In many systems, memory paging is used to increase the effective size of physical memory. In paging systems, physical page frames can be swapped to a hard disk, and replaced in physical memory as they arc needed.

Notice that not all pages of the virtual address space are actually mapped to physical page frames-only those pages actually used by the associated process are mapped or "allocated." Generally, a process is only allowed to access these allocated virtual memory addresses. Accessing other addresses generates a memory fault or exception that in some cases causes the offending process to be terminated. For purposes of this description virtual addresses that have not been allocated-that have not been mapped to physical memory-are referred to as invalid virtual memory addresses. The term invalid as used herein does not refer to virtual memory addresses whose corresponding physical memory has been paged to disk.

It is often necessary for a user process to invoke system or kernel functions. When a user process calls a system function, the computer processor traps the call and switches the current execution thread from user mode to kernel mode. The kernel takes control of the thread, validates the arguments received from the thread and then executes the designated system function. The operating system switches the thread back to user mode before returning control to the user process. In this way, only system functions are allowed to execute from the privileged kernel mode. This protects the kernel and its data from perusal and modification by user processes.

It is often necessary for kernel functions to accept data from and to provide data to user processes. This is effectively accomplished using memory buffers or regions, located in the virtual address space of the user. The locations of such buffers are specified to kernel functions as pointer arguments in system calls. Each pointer contains a virtual memory address.

However, to protect its integrity the kernel must guard itself against faulty pointers supplied by user processes. For example, a user process might mistakenly or maliciously supply a pointer to a protected kernel address, thus potentially causing the kernel to write over itself. This must be prevented. As another example, a user process might mistakenly supply an invalid pointer-one containing a virtual memory address that has not been allocated to physical memory. In this situation, the kernel must be able to handle the resulting memory fault gracefully, without terminating.

In prior art Unix systems, protection against such faulty pointers can be implemented using copying and copyout functions. Prior to using a user-supplied pointer, the kernel is programmed to make a copy of the data referenced by the pointer, using the Unix-supplied copying and copyout functions. These functions perform bounds checking to ensure that specified pointers are not in the kernel's address space, and also detect invalid pointers. The function returns an error code if there is any problem with the pointer. While this approach works, it is very inefficient since actual data copies are made.

In other operating systems, bounds checking and "try-except" procedures are implemented in the kernel before actually using any user-supplied pointer. However, this requires specific procedures to be implemented at many places in the kernel, it is inefficient and prone to errors.

A third prior art approach is to examine currently existing virtual-tophysical address mappings to determine if a pointer is valid. However, this approach is extremely inefficient and does not work in multi-tasking or multi-processor environments. In such an environment, a process might check and determine that a particular pointer is valid, be preempted, and then resume execution without realizing that the pointer is no longer valid.

The inventors have discovered a very effective way to protect kernel functions against faulty pointers, without requiring any special measures within the individual kernel functions themselves.

SUMMARY OF THE INVENTION

Rather than trying to check for invalid pointers, the operating system of this invention waits for a kernel function to attempt to use an invalid virtual memory address. When this occurs, the memory fault handler automatically maps the virtual memory address to a common scratch location in physical memory. Thus, the kernel function can complete its execution without encountering an exception. Before returning control to the calling user process, the operating system checks whether an invalid address was encountered by the kernel function, and returns an error code if appropriate.

The physical memory scratch location is cleared between context changes to prevent processes from using the scratch location as a means of communicating with each other.

In addition, the kernel bounds-checks any virtual memory addresses specified as arguments in calls to the kernel function. This step is performed to ensure that any specified virtual memory address is not part of the kernel address space, and prevents a user process from using the kernel to indirectly access the kernel address space.

DETAILED DESCRIPTION OF THE PREFERRED EMBODIMENT

Figure 1:
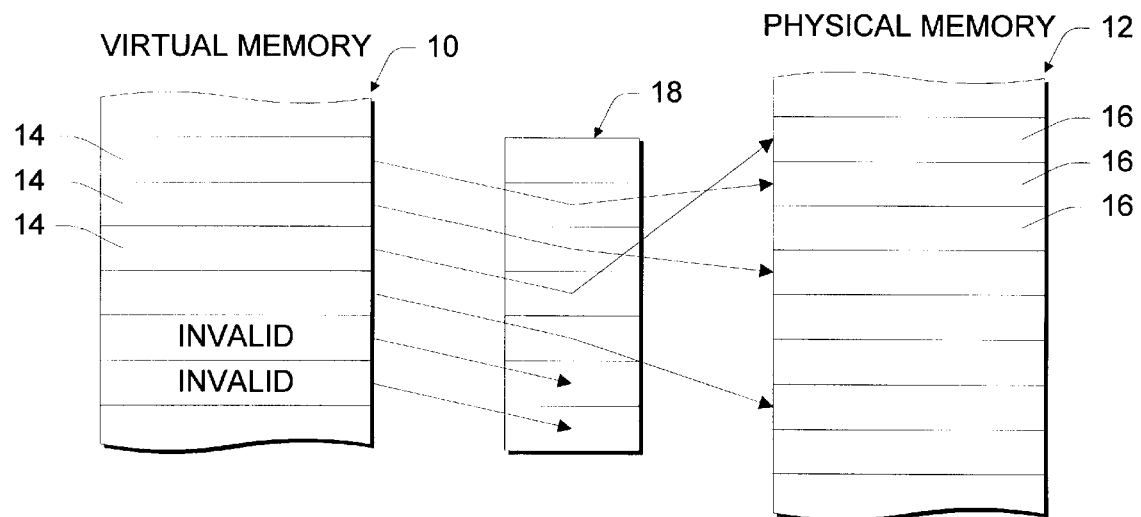
FIG. 1 is a block diagram of a memory system in accordance with the prior art.
Figure 2:
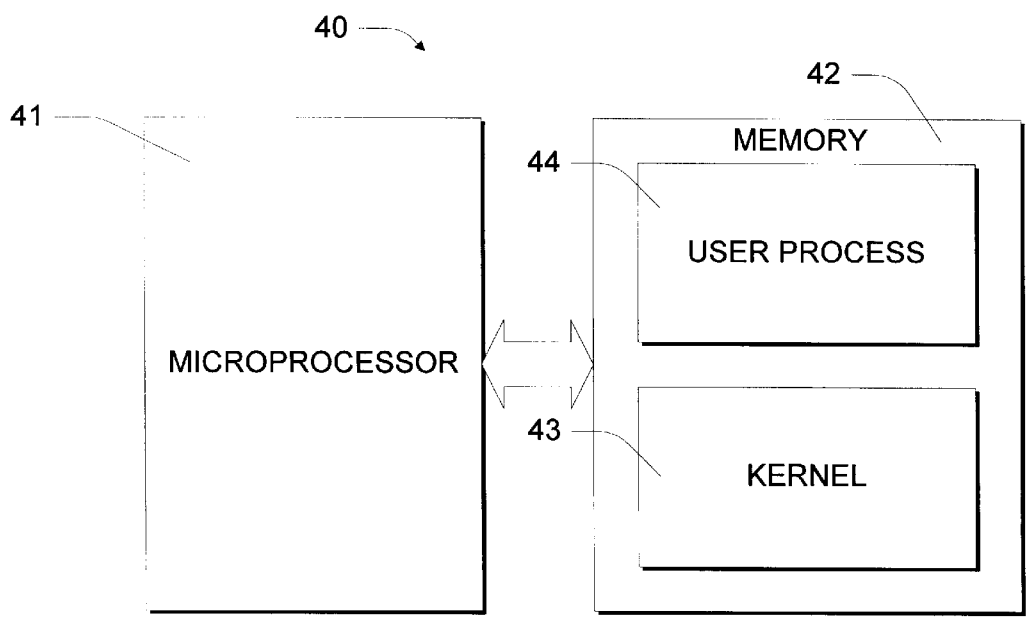
FIG. 2 is a block diagram of a computer system in accordance with a preferred embodiment of the invention.

FIG. 2 shows pertinent hardware components of a computer system in accordance with a preferred embodiment of the invention, generally designated by reference numeral 40. Computer system 40 can be any one of a variety of different types of devices including consumer appliances such as set-top boxes, hand-held or pocket computers, Internet terminals, desktop computers, laptop or notebook computers, server computers, and CD/DVD game players.

Computer system 40 includes a microprocessor 41 and a computer-readable storage medium such as electronic memory 42. As will be explained below, a page frame or other portion of physical memory is designated as a scratch location.

Although FIG. 2 shows only a single processor, the system might include a plurality of processors, used by a plurality of different processes or tasks, each having one or more execution threads. The terms task and process as used in this description refer to executing entities within a computer system having their own virtual address spaces. Computer system 40 also includes other typical computer hardware, not shown, such as interface electronics; operator input and output devices; and audio and video rendering devices.

Physical memory 42 preferably comprises randomly accessible read/write electronic memory (RAM). In a memory paging system, memory 42 might also include secondary storage such as a magnetic hard disk or other data recording media. Memory 42 might also includes other types of computer-readable storage media on which executable components are distributed and stored, including floppy disks, CD-ROMs, and non-volatile electronic memory such as EPROMs.

Processor 40 is a conventional, off-the-shelf microprocessor such as a R3000 microprocessor, manufactured by MIPS Technologies of Mountain View, Calif. or an x86 series microprocessor, manufactured by Intel Corporation of Santa Clara, Calif. It has internal logic for implementing a virtual memory system. Virtual memory allows the execution of processes that are not completely stored in physical memory 42, allows the creation of protected address spaces, allows re-mapping or sharing of data without actual copying, and allows the construction of virtually contiguous memory out of physically fragmented and discontiguous memory. Other processors could also be used to implement the invention.

In accordance with conventional computer systems, computer system 40 includes an operating system and one or more application programs that execute in conjunction with the operating system. FIG. 2 shows a portion 43 of the operating system referred to as the kernel, and a single application or user process 44. Although only one user process is shown, a plurality of user processes typically execute from memory 42.

The computer system has a virtual memory system implemented by the operating system. Different user processes have their own virtual address spaces.

The kernel includes protected functions or threads that can be called by user processes to perform system-related tasks such as memory allocation, task scheduling, etc. The kernel functions accept virtual memory pointers from the user processes. Specifically, virtual memory addresses are passed to kernel functions in the form of arguments associated with function calls. The kernel functions are expected either to read from or write to the virtual memory addresses supplied by user processes.

Processor 41 has privileged and non-privileged execution modes as explained above. User processes run in the non-privileged execution mode, and make calls to system or protected kernel functions that execute in the privileged execution mode. In addition, there is a protected kernel address space that is reserved for exclusive use by the kernel. User processes have their own respective virtual address spaces, and are prevented from accessing the kernel address space.

Figure 3:
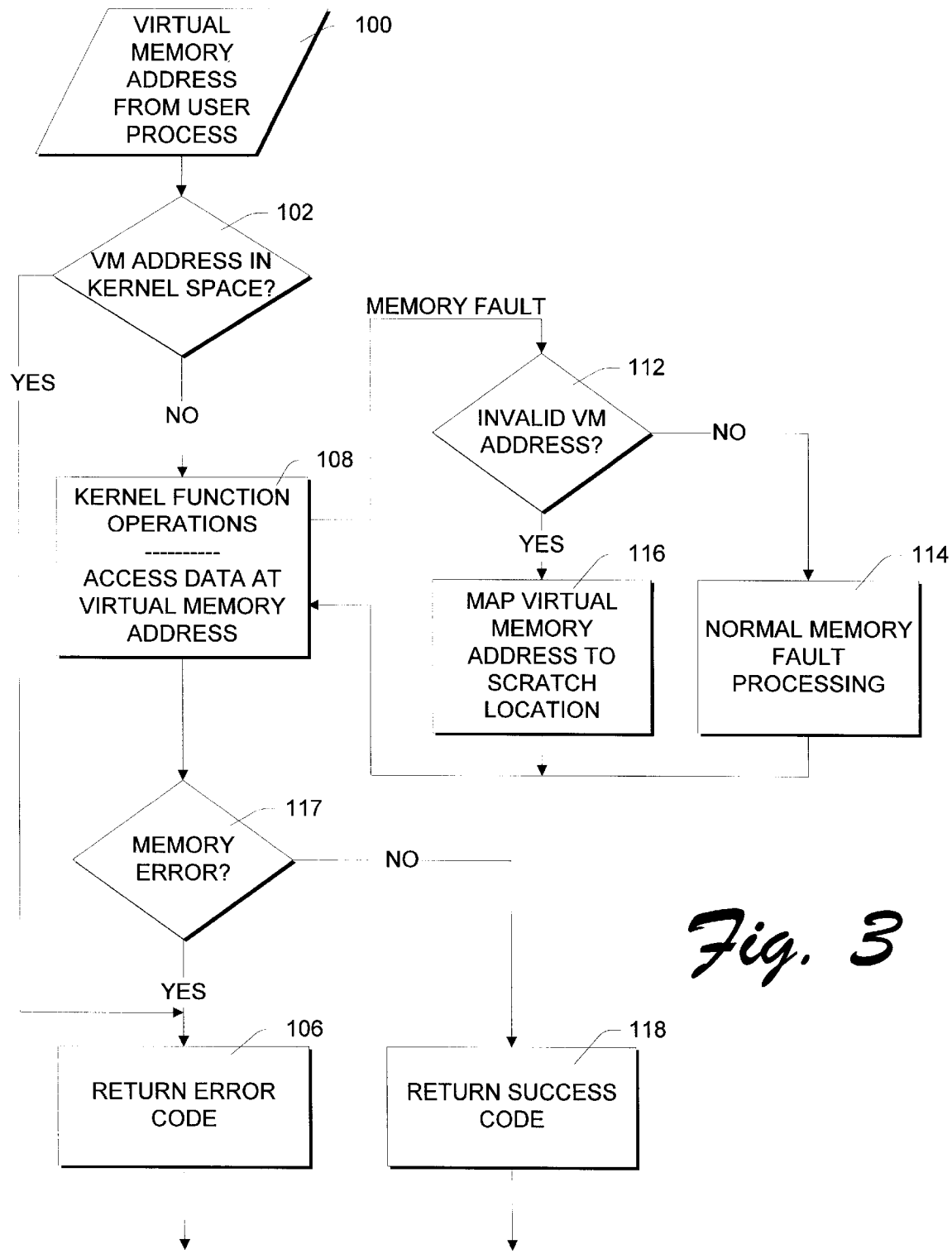
FIG. 3 is a flowchart showing preferred methodological steps in accordance with the invention.

FIG. 3 shows preferred methodological steps in accordance with the invention. The invention includes these steps as well as computer-readable media having instructions for performing such steps in conjunction with a microprocessor or computer.

A step 100 comprises passing or otherwise providing a virtual memory address to a protected kernel function or other executable program component. The virtual memory address is preferably passed as a pointer argument in a function call from a user process. The pointer is expected to reference the virtual address space of the user process that is providing the pointer.

Calls to kernel functions are made in a conventional manner by raising an exception which causes the processor to transfer control to a kernel exception handler. The exception handler, which executes in the privileged execution mode like other kernel components, identifies the exception as a call to a kernel function and initiates a system call handler. All arguments provided by the calling user process are passed on to the system call handler.

The system call handler, before passing control to the actual kernel function requested by the user process, performs a step 102 of bounds-checking any virtual memory addresses specified as arguments in the call to the kernel function. To identify arguments that will be interpreted as virtual memory addresses, the system call handler maintains a table of available kernel functions, categorizing their arguments. The bounds-checking ensures that any specified virtual memory address is not part of the kernel address space. If the result of this test is true, and a specified virtual memory address is indeed part of the kernel address space, a step 106 is executed of immediately returning an error code to the calling user process. This step ensures that a user process cannot "trick" kernel functions into reading or writing kernel address space.

If the result of this test is false, and a specified virtual memory address is not part of the kernel address space, a step 108 is performed of executing the requested kernel function, including using any pointers specified by the calling user process. Thus, this step comprises actually accessing the virtual memory location specified by the virtual memory address.

During step 108, which potentially involves various operations, memory faults of various types are likely to occur. One type of memory fault, for example, occurs with a TLB miss. Another type of memory fault, with which the present invention is primarily concerned, occurs when using or accessing an invalid virtual memory address that has been supplied by a calling user process-a virtual memory address that has not been mapped to physical memory.

When a memory fault occurs during step 108, execution of the kernel function is suspended and control is transferred to a memory fault handler. Within the memory fault handler, a determination is made regarding the type of memory fault. This includes a step 112 of detecting whether the virtual memory address that caused the fault is an invalid address. If not, and the memory fault was caused for some other reason, the memory fault is handled in block 114 according to the type of memory fault. The present invention does not concern the handling of such other types of memory faults.

If, on the other hand, the memory fault was caused by an invalid virtual memory address, a step 116 is performed of mapping the invalid virtual memory address to an actual location in physical memory which is reserved for this purpose. This location is referred to herein as a scratch location or scratch page. Once this mapping is completed, the kernel function is rescheduled and goes on with its execution in step 108. The kernel function itself does not detect that there was any problem. When it accesses the virtual memory address supplied by the user process, it actually accesses the scratch page.

Figure 4:
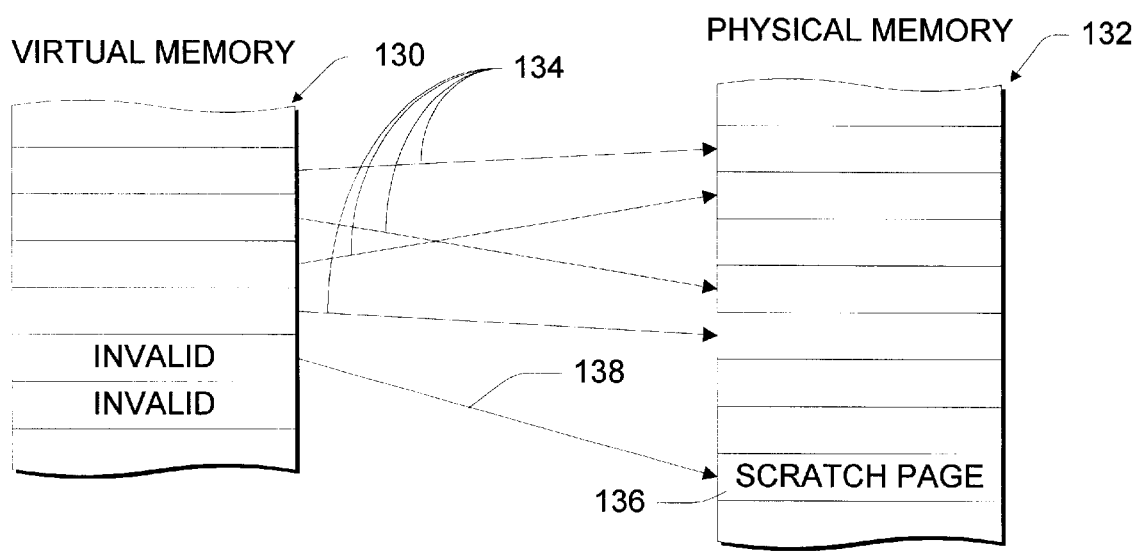
FIG. 4 is a block diagram showing memory mappings in accordance with the preferred embodiment of the invention.

The resulting virtual-to-physical mappings are shown in FIG. 4, which shows a portion of a user virtual memory address space 130 and a portion of physical memory 132. Notice that there are a plurality of normal mappings 134 from virtual memory pages to physical page frames. Any invalid virtual memory page frame that is encountered or used is automatically mapped to a common scratch page 136 by a temporary mapping 138. If two different invalid virtual memory addresses are encountered during execution of a kernel thread, the pages containing each of the different addresses are mapped to the same scratch page 136 in physical memory. Even invalid addresses from different user address spaces are mapped to the same common scratch page.

When the kernel function has completed, control is returned to the system call handler. The system call handler performs a step 117 of determining whether an invalid virtual memory address was encountered during execution of the kernel function. Step 106 is performed if such an invalid virtual memory address was encountered-in response to mapping an invalid virtual memory address to the scratch location. Step 106 comprises generating an exception or returning an error code to the calling user process. Otherwise, if no invalid virtual memory address was encountered, a step 118 is performed of returning a success code to the calling process.

Step 117 is accomplished by maintaining flags, corresponding to user threads, respectively, that indicate whether the called kernel functions encountered invalid virtual memory addresses. The flag corresponding to a particular thread is reset by the system call handler upon initiating a kernel function, just prior to step 108. The memory fault handler sets the flag upon making a mapping to the scratch page. Before returning control to the calling user thread, the system call handler examines the flag and returns an error indication if the flag is set.

At each context change, when the operating system switches from one user process to another, the kernel clears all scratch page mappings and also clears any data that the protected kernel functions have written to the common scratch location. This prevents any communication between processes that might otherwise be conceivable. A single flag is maintained by the operating system to indicate whether the scratch location has been used. The clearing step is performed only if this flag indicates that the scratch location has indeed been used since it was last cleared.

The invention provides an efficient way for an operating system kernel to handle invalid memory pointers supplied by user processes. In contrast to the prior art, the invention does not require each kernel function to individually protect itself before using user-supplied pointers. Rather, bad pointers are resolved transparently to the individual kernel functions. Because of this, it is easy and efficient to call kernel functions from both user code (whose arguments must be validated) and kernel code (whose arguments are already presumed to be valid). Furthermnore, other than bounds-checking, no processing is required until an invalid pointer is actually encountered, and even then only minimal processing is required.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. In a computer system having virtual memory, a method comprising the following steps:

passing a virtual memory address to an executable program component; accessing the virtual memory address from the executable program component;

during said accessing, detecting when the virtual memory address is invalid and in response mapping the invalid virtual memory address to a scratch location in physical memory;

wherein the accessing step accesses the scratch location.

2. A method as recited in claim 1 and further comprising a step of designating a common scratch location in physical memory and mapping different invalid virtual memory addresses to said common scratch location.

3. A method as recited in claim 1 wherein the virtual memory address is within a virtual memory page, the mapping step comprising a step of mapping said virtual memory page to a physical memory page.

4. A method as recited in claim 1 and further comprising a step of generating an error indication from the executable program component in response to mapping the invalid virtual memory address to the scratch location.

5. In a computer system having user processes and protected kernel functions that access virtual memory, a method comprising the following steps:

calling a protected kernel function from a user process;

providing a virtual memory address as an argument when calling the protected kernel function;

accessing the virtual memory address from the protected kernel function;

during said accessing, generating a memory fault if the virtual memory address is invalid and in response mapping the invalid virtual memory address to a scratch location in physical memory;

wherein the accessing step accesses the scratch location.

6. A method as recited in claim 5 wherein the virtual memory address is within a virtual memory page, the mapping step comprising a step of mapping said virtual memory page to a physical memory page.

7. A method as recited in claim 5 and further comprising a step of designating a common scratch location in physical memory and mapping different invalid virtual memory addresses to said common scratch location.

8. A method as recited in claim 5 and further comprising a step of generating an error indication from the protected kernel function component in response to mapping the invalid virtual memory address to the scratch location.

9. A computer-readable storage medium having computer-executable instructions for performing the steps recited in claim 5.

10. In a computer system having a user process and protected kernel functions, the computer system having a kernel address space that the user process is prevented from accessing, a method comprising the following steps:

calling a protected kernel function from the user process;

providing a virtual memory address as an argument when calling the protected kernel function;

bounds-checking the virtual memory address to ensure that it is not part of the kernel address space;

accessing the virtual memory address from the protected kernel function if the virtual memory address is not in the kernel address space;

during said accessing, generating a memory fault if the virtual memory address is invalid and in response mapping the invalid virtual memory address to a scratch location in physical memory;

wherein the accessing step accesses the scratch location.

11. A method as recited in claim 10 and further comprising a step of returning an error indication if the virtual memory address is in the kernel address space.

12. A method as recited in claim 10 and further comprising a step of designating a common scratch location in physical memory and mapping different invalid virtual memory addresses to said common scratch location.

13. A method as recited in claim 10 and further comprising a step of generating an error indication from the protected kernel function in response to mapping the invalid virtual memory address to the scratch location.

14. A computer-readable storage medium having computer-executable instructions for performing the steps recited in claim 10.

15. In a computer system having a plurality of user processes and having protected kernel functions, a method comprising the following steps:

calling protected kernel functions from the user processes;

providing virtual memory addresses as arguments when calling the protected kernel functions;

accessing the virtual memory addresses from the protected kernel functions;

during said accessing, detecting when virtual memory addresses are invalid and in response mapping invalid virtual memory addresses to a common scratch location in physical memory;

wherein the accessing step accesses the scratch location;

upon context changes from one user process to another, clearing any data that the protected kernel functions have written to the common scratch location.

16. A method as recited in claim 15 wherein the virtual memory addresses are within virtual memory pages, the mapping step comprising a step of mapping said virtual memory pages to a common physical memory page.

17. A method as recited in claim 15 and further comprising a step of generating an error indication from a particular protected kernel function when an invalid memory address is detected during execution of said particular protected kernel function.

18. A computer-readable storage medium having computer-executable instructions for performing the steps recited in claim 15.

19. A computer system comprising:

physical memory having a portion that has been designated as a scratch location;

a virtual memory system that supports the execution of processes that are not completely stored in the physical memory;

a protected kernel including kernel functions that accept virtual memory addresses as arguments from user processes, wherein the kernel functions access such virtual memory addresses;

a virtual memory fault handler that detects invalid virtual memory addresses while they are being accessed and in response maps the invalid virtual memory addresses to the scratch location in physical memory;

wherein the kernel functions access the scratch location when accessing invalid virtual memory addresses.

20. A computer system as recited in claim 19, further comprising a kernel virtual address space that user processes are prevented from accessing, wherein the protected kernel is configured to bounds-check virtual memory addresses accepted from user processes to ensure that they are not part of the kernel virtual address space.

21. A computer system as recited in claim 19, further comprising a plurality of user processes, wherein the protected kernel is configured to clear any data written to the scratch location upon context changes from one user process to another.

22. A computer system as recited in claim 19, wherein the scratch location comprises a single page of the physical memory.

23. A computer system as recited in claim 19, wherein the protected kernel is configured to return an error indication to a calling user process in response to detecting an invalid virtual memory address during execution of a particular kernel function.

24. A computer-readable storage medium having instructions that are executable by a computer having virtual memory for performing steps comprising:

passing a virtual memory address to an executable program component;

accessing the virtual memory address from the executable program component;

during said accessing, detecting when the virtual memory address is invalid and in response mapping the invalid virtual memory address to a scratch location in physical memory;

wherein the accessing step accesses the scratch location.

25. A computer-readable storage medium as recited in claim 24, the steps further comprising a step of designating a common scratch location in physical memory and mapping different invalid virtual memory addresses to said common scratch location.

26. A computer-readable storage medium as recited in claim 24, wherein the virtual memory address is within a virtual memory page, the mapping step comprising a step of mapping said virtual memory page to a physical memory page.

27. A computer-readable storage medium as recited in claim 24, the steps further comprising a step of generating an error indication from the executable program component in response to mapping the invalid virtual memory address to the scratch location.

* * * * *